United States Patent [19]
Craig

[11] 3,735,415
[45] May 22, 1973

[54] EMITTER LOCATION MAPPING DEVICE

[75] Inventor: Dwin R. Craig, Gaithersburg, Md.

[73] Assignee: Ingenuics, Inc., Gaithersburg, Md.

[22] Filed: Jan. 9, 1970

[21] Appl. No.: 1,639

[52] U.S. Cl. ......... 346/33 B, 178/6.7 R, 250/83.6 S, 343/118, 346/107 R
[51] Int. Cl. ............................................. G01d 9/42
[58] Field of Search ..................... 346/33 B, 33 EC, 346/37, 8, 107, 108; 343/118; 250/83.6 S; 178/6.7; 325/31, 311

[56] References Cited

UNITED STATES PATENTS

| | | | |
|---|---|---|---|
| 2,920,320 | 1/1960 | Ross | 343/112 R X |
| 2,940,074 | 6/1960 | Watt | 346/33 B X |

*Primary Examiner*—Joseph W. Hartary
*Attorney*—Elton H. Brown, Jr.

[57] ABSTRACT

An emitter location mapping device in which a vehicle mounted rotating direction finding sensor of emitter radiations is actuated by the emitter radiation to supply trigger pulses to a sychronously rotated line source of light which underexposes film that is moved past the exposing head at a rate proportional to ground speed. The intersection of a plurality of underexposures for each emitter location produces a localized exposure on the film at the location of the radiation emitter. The ratio of film speed to ground speed determines the scale of the resulting map.

5 Claims, 3 Drawing Figures

EMITTER LOCATION MAPPING DEVICE

BACKGROUND OF THE INVENTION

1. Field of the Invention

The present invention relates to the mapping or plotting of radiation emitters which emit radiations including such as gamma rays, X-rays, microwaves, HF communications, RF beacons, TV, radio, electrical power disturbances, radio noise, infrared radiations, visible light, lightening, and sound.

2. Description of the Prior Art

Prior art devices for plotting radiation emitters required two separate direction finding receivers which are spaced apart a known distance coupled with a triangulation drafting system to plot the position of the radiation emitter on a map.

No prior art devices or methods are known for directly forming the map as the map forming apparatus passes adjacent the radiation emitters.

SUMMARY OF THE INVENTION

The present invention consists of a vehicle mounted rotating source of a line of light which is pulsed by a rotating sensor as the sensor detects a radiation emitter. The sensor and the source of the line of light rotate at the same speed and have the same orientation so that each time the sensor is pointed at a radiation emitter, the source of the line of light will be energized to flash project a line of light onto a film. The amount of illumination is less than the threshold for producing an image on the film and hence only those points on the film which have been exposed a plurality of times will have received enough light to produce an image, with this image location determined by the location of the emitter. The film is moved past the line of light projecting apparatus at a speed proportional to the ground speed of the vehicle so that each time the line of light projector is flashed by the sensor it will have a new position with respect to the film.

The sensor is limited to certain types of radiation sensing but can be made sensitive to other types by modifying the sensing elements. In other words, a sensing element which is sensitive to and detects microwaves would not be affected by visible light and vice versa.

The primary object of the invention is to provide an apparatus for producing a map of the desired radiation emitters with the map being formed directly during the passage of the vehicle mounted sensor adjacent the emitters.

DESCRIPTION OF THE PREFERRED EMBODIMENT

Figure 1:
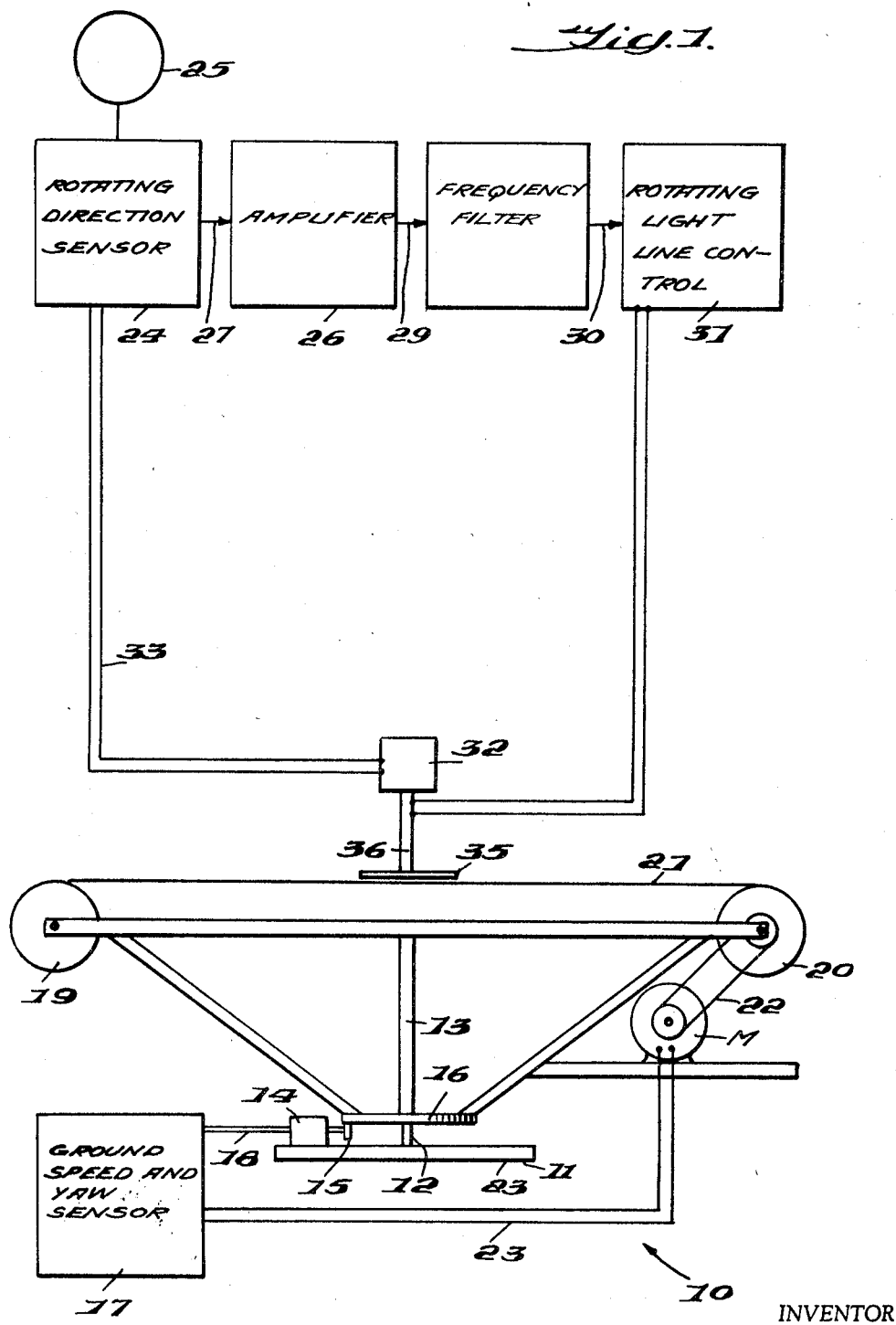
FIG. 1 is a semi-diagrammatic view of the invention.
Figure 2:
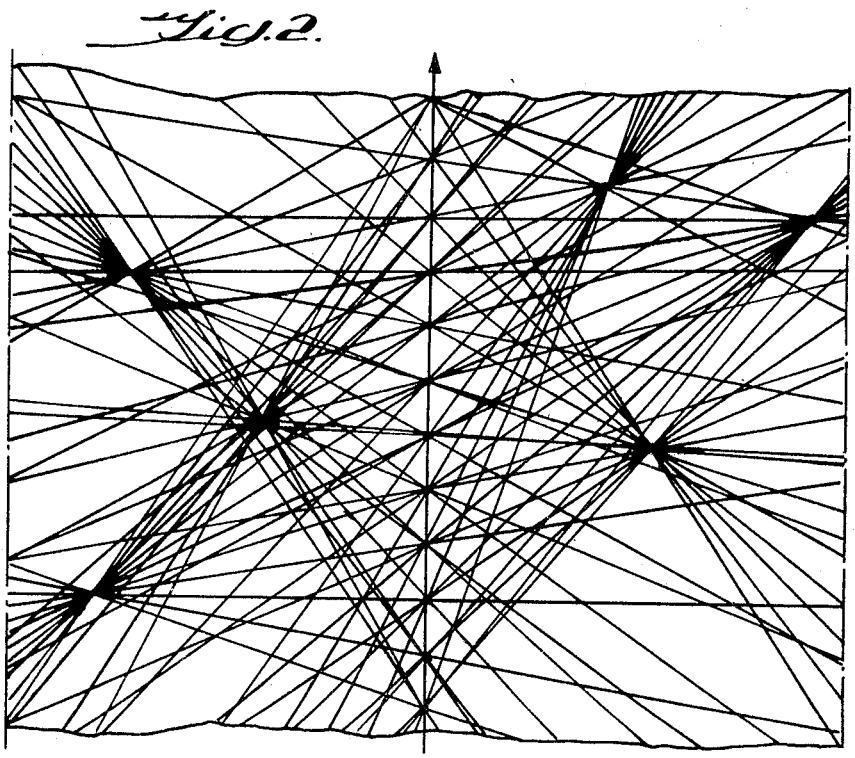
FIG. 2 is a diagrammatic view of the projected lines of light used in producing one of the maps formed by the invention illustrated in FIG. 1.
Figure 3:
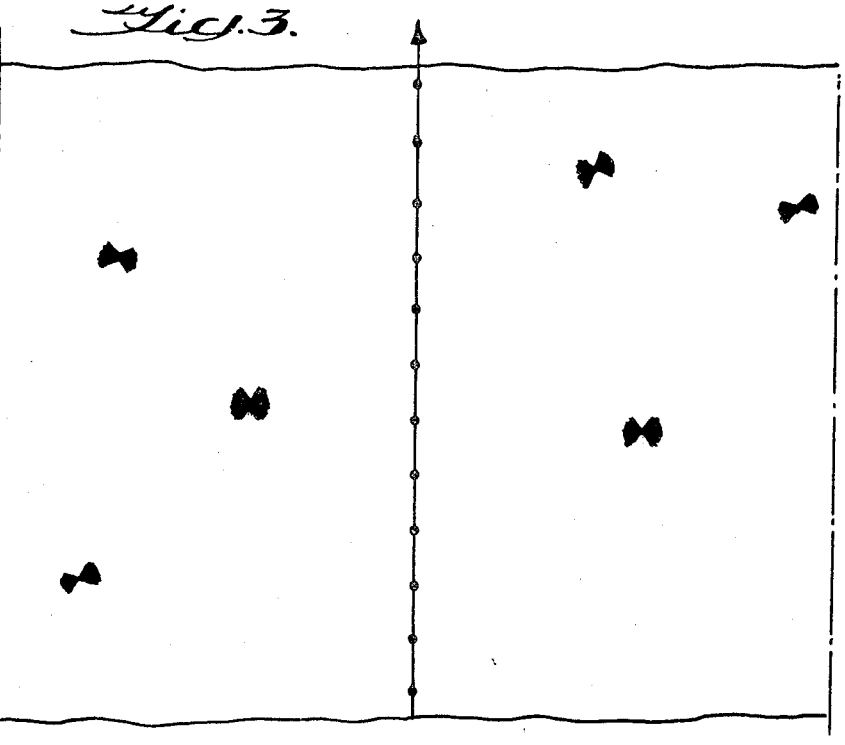
FIG. 3 is one of the maps formed by the invention illustrated in FIG. 1.

Referring now to the drawings in detail wherein like reference characters indicate like parts throughout the several Figures, reference numeral 10 indicates generally a mapping device for radiation emitters constructed in accordance with the invention.

The device 10 includes a base 11 which is mounted on an airplane or other vehicle from which the emitters are to be detected. The base 11 has a pivot 12 mounted centrally thereof carrying a frame 13 mounted for rotation on the pivot 12. A servo motor 14 is also mounted on the base 11 and has a drive wheel 15 engaging a disc 16 forming part of the frame 13 so that the frame 13 is rotated on the pivot 12 under control of a conventional ground speed and yaw sensor 17. The servo motor 14 is connected by wires 18 to the ground speed and yaw sensor 17 to maintain the direction of movement of the film 21 parallel to the track of the vehicle over the ground. The frame 13 has a film supply reel 19 journalled in one end thereof and a film take-up reel 20 journalled in the other end thereof above the base 11. Film 21 extends from the supply reel 19 to the take-up reel 20 and is moved therebetween as the take-up reel 20 is rotated.

A motor M connected by a belt 22 to the take-up reel 20 drives the take-up reel 20 at a speed proportional to the ground speed of the vehicle. Wires 23 connect the motor M to the ground speed and yaw sensor 17 so as to maintain the speed of the film 21 proportional to the ground speed of the vehicle.

A rotating direction sensor 24 is mounted on the vehicle and is provided with a sensing element 25 (which may take the form of a loop antenna for sensing radio waves). An amplifier 26 receives a signal from the rotating direction sensor 24 through a wire 27 and this signal is amplified and sent to a frequency filter 28 through a wire 29. A signal passes from the frequency filter 28 through a wire 30 to a rotating line of light control 31.

A motor 32 rotates at the same speed as the rotating direction sensor 24 and is connected thereto by a pair of wires 33 so that rotation of the motor 32 will be synchronous with the rotation of the direction sensor 24. A source of a line of light 35 is connected to the motor 32 by a shaft 36 with the source of light 35 immediately overlying the film 21. Wires 37 connect the light 35 to the rotating line of light control 31 to flash the light 35 each time a signal is received by the rotating line of light control 31.

The duration of the flash of the light 35 and the intensity of the light 35 are such that no image is produced on the film 21 corresponding with individual flashes of the light 35. However, as a plurality of flashes from the light 35 are received by the film 21, the film begins to become exposed at the intersection of the lines of light and the position of this intersection will exactly correspond with the position of the radiation emitter located on the ground which caused the flashes to occur.

In the apparatus illustrated in FIG. 1, the sensor 25 is a loop antenna of the type used for locating radio waves and as these radio waves reach the loop antenna 25 on each revolution of the antenna 25, a pulse is developed in the rotating direction sensor 24 and is sent to the amplifier 26 and amplified. The amplified pulse then is directed to the frequency filter 28 which filters out all waves except those which are being mapped. In this case we will say broadcast radio waves are passed and all other waves are filtered out by the frequency filter 28. The pulse corresponding to broadcast radio waves then actuates the rotating line of light control 31 which flashes the light 35 to project a line of light on the film 21 corresponding to the line from the radiation emitter being detected to the sensor 25. Now the sensor 25 rotates and as it moves through 360° another pulse passes to the rotating light line control 31 to produce another flash in the light 35. As the sensor 25 was rotating through 360° the film 21 was moved from the reel 19 toward the reel 20 by the motor M a distance proportional to the travel of the vehicle over the ground. The next line of light produced on the film 21 will then only coincide with the first line of light at that point where the two lines of light cross, which is of course the location of the radiation emitter. As the rotation of the line of light 35 continues and the rotating direction sensor 24 continues to receive the pulses from the radiation emitters being detected, a number of flashes of light will be impressed on the film 21 with these flashes all crossing at the point from which the signal is emitted. Obviously, as the number of flashes exceeds the threshold for exposing the film, an image will be formed at the intersecting point plotting the location of the radiation emitter being detected.

It is important that the film 21 travel parallel to the line of movement of the vehicle and since airplanes and boats often yaw, the frame 13 can be adjusted by the servo motor 14 under control of the ground speed and yaw sensor 17 to maintain the film 21 parallel to the line of movement.

Other types of waves may be detected by various antennas so that if TV waves are to be detected and mapped, a dipole antenna would be used. In the case of microwaves, a parabolic reflector type of antenna would be used and in the case of X-rays a scintillation detector or Geiger counter tube would be used. Obviously the particular antenna used would be determined by the type of radiation emitter being mapped and various combinations of antennas could be used to map combinations of radiation emitters.

The rotating direction sensor 24 in addition to detecting waves from a radiation emitter may also when desired react to the strength of the waves so that the brilliance of the flash of light by the light 35 may be directly related to the strength of the incoming signal from the radiation emitter. This will have the effect of producing various brightnesses of images in the final map with the brightness of the image being directly related to the strength of the signal producing it. In this manner, it would be possible to sort out weak radiation emitters from strong radiation emitters to produce a more useful map.

In the case of intermittent emissions from the radiation emitter, it is possible that the sensor 24 could totally miss the emission or would only detect a portion of the emissions to produce a somewhat dimmer image than that which would be produced by a constant emission.

There are many fields of endeavor in which an accurate map or plot of radiation emitters could be useful. Obviously, military plots or maps of both enemy and friendly territories would be quite useful in locating lost persons having a radio transmitter on their person, enemy broadcasting stations, concentrations of radio carrying troops, vehicles carrying radio broadcast equipment, and other similar concentrations. By utilizing known locations of radiation emitters the device could be used as a navigation tool. By utilizing known locations of radiation emitters the device could be used to accurately pinpoint locations for map plotting.

Having thus described a preferred embodiment of the invention, it should be understood that numerous structural modifications and adaptations may be resorted to without departing from the spirit of the invention.

What is claimed is:

1. A radiation emitter mapping device for use in a moving vehicle, comprising a light sensitive film, means moving the film in the direction of and at a speed proportional to the ground speed of the movement of the vehicle, a rotating source of a line of light overlying said film, a rotating radiation emitter direction sensor, means coupling said sensor and said source of a line of light for synchronous rotation, and means controlled by said sensor for flashing said source of a line of light with the duration and intensity of each flash being individually less than that required to produce an image on said light sensitive film.

2. A device as claimed in claim 1 wherein means are provided on said vehicle for aligning the direction of travel of said film with the true direction of travel of said vehicle.

3. A device as claimed in claim 1 wherein the means for flashing the source of said line of light includes a frequency filter to pass only desired signals from said sensor.

4. A device as claimed in claim 1 wherein said rotating sensor includes a rotating antenna sensitive to the waves of the radiation emitter to be sensed.

5. A device as claimed in claim 1 wherein said vehicle is an airplane.

* * * * *